(12) United States Patent
Kawabe

(10) Patent No.: US 6,459,863 B2
(45) Date of Patent: Oct. 1, 2002

(54) METHOD AND SYSTEM FOR INFORMATION CONTROL CAPABLE OF EFFECTIVELY PERFORMING AN AUTOMATIC PAYMENT FOR MAINTENANCE EXPENSES

(75) Inventor: Masahiro Kawabe, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/801,227

(22) Filed: Mar. 7, 2001

(30) Foreign Application Priority Data

Mar. 7, 2000 (JP) .......................... 2000-062373

(51) Int. Cl.[7] ................ G03G 15/00; G03G 15/08; G04L 12/24; H04N 1/00
(52) U.S. Cl. .................. 399/79; 399/8; 399/24
(58) Field of Search ................. 399/79, 8, 9, 24, 399/25, 26, 27; 358/1.15, 1.16

(56) References Cited

U.S. PATENT DOCUMENTS 5,303,005 A * 4/1994 Takano et al. ................. 399/8
5,444,779 A * 8/1995 Daniele .......................... 380/3
5,594,529 A * 1/1997 Yamashita et al. ............. 399/8
5,745,883 A * 4/1998 Krist et al. ..................... 705/34
6,112,039 A * 8/2000 Salgado et al. ............. 399/8 X

FOREIGN PATENT DOCUMENTS

JP 9-120249 5/1997

* cited by examiner

Primary Examiner—Sophia S. Chen
(74) Attorney, Agent, or Firm—Cooper & Dunham LLP

(57) ABSTRACT

An image forming apparatus includes an image forming mechanism for performing an image forming operation, a detachable process cartridge, a card inlet having a data input and output port, and a controlling mechanism. The process cartridge contains material used to make the image visible. The card inlet receives for electrical connection an electronic money integrated circuit card including an integrated circuit chip dedicated to an electronic money application. The controlling mechanism having an integrated circuit chip dedicated to the electronic money application controls the image forming operation and is capable of communicating for monetary information with the electronic money integrated circuit card.

39 Claims, 11 Drawing Sheets

METHOD AND SYSTEM FOR INFORMATION CONTROL CAPABLE OF EFFECTIVELY PERFORMING AN AUTOMATIC PAYMENT FOR MAINTENANCE EXPENSES

BACKGROUND

1. Field

The present application relates to a method and system for information control, and more particularly to a method and system for information control that can effectively perform an automatic payment for machine maintenance expenses.

2. Background

Many image forming devices, such as a laser printer, a copying machine, a facsimile machine, etc. are provided with a storage means for storing various kinds of job information mainly for maintenance purposes. The job information typically includes daily power-on hours, a cumulative number of prints performed, dates of installation relative to specific components requiring a periodic exchange such as toner, a photoconductive member, etc. Based on the job information, an image forming apparatus usually calculates a remaining life length of each specific component and determines if any one of the specific components needs to be exchanged due to an end of its life. If the machine determines that a specific component needs to be exchanged, this will be indicated to the user who will then take a necessary action; exchanging the component by the user alone or contacting a repair center to ask for service.

Office equipment technology increasingly takes into account concerns for natural resource savings and recycling. Published Japanese Unexamined patent application, Ser. No. 09-120249, relating to a recycling of a process cartridge used in an image forming apparatus is one example. This application, Ser. No. 09-120249, describes an image forming apparatus which includes a process cartridge having a storage for storing recycling information relative to the process cartridge. The process cartridge of this image forming apparatus further includes a connection connecting to the above storage, a detection for detecting the recycling information, and a power supply unit. The image forming apparatus attempts to appropriately indicate to the user when to carry out a recycling of the process cartridge.

Recycling of the process cartridge involves procurement of a new process cartridge, shipping arrangement, user's settlement of the fee for exchange, storage of the exchanged process cartridge until it is collected by a collection company, etc, in addition to actually replacing the cartridge. As these processes are ongoing, the user may place an order for consumable items such as toner, which will also involve processes similar to the above. As a result, this may require a complex system for a control center to handle a plurality of customers of image forming apparatuses.

SUMMARY

The present application describes a novel image forming apparatus. In one example, a novel image forming apparatus includes an image forming mechanism, a process cartridge, a card inlet, and a controlling mechanism. The image forming mechanism is configured to perform an image forming operation for forming an image on a recording sheet. The process cartridge is configured to contain material used to visualize the image and is detachably installed in the apparatus. The card inlet is configured to receive an electronic money integrated circuit card. The card inlet includes a data input and output port for connecting the electronic money integrated circuit card when it is inserted in the card inlet, wherein the above electronic money integrated circuit card includes an integrated circuit chip dedicated for an electronic money application. The controlling mechanism is configured to control the image forming operation performed by the image forming mechanism, includes an integrated circuit chip dedicated for the electronic money application, and is capable of communicating for monetary information with the electronic money integrated circuit card via the data input and output ports.

The present application further describes another novel image forming apparatus. In one example, another novel image forming apparatus includes an image forming mechanism, a process cartridge, and a controlling mechanism. The image forming mechanism is configured to perform an image forming operation for forming an image on a recording sheet. The process cartridge is configured to contain material used to visualize the image and is detachably installed in the apparatus. The above process cartridge includes an electronic money application unit which includes an integrated circuit chip dedicated for an electronic money application. The controlling mechanism is configured to control the image forming operation performed by the image forming mechanism and includes an integrated circuit chip dedicated for the electronic money application. The above controlling mechanism is capable of communicating for monetary information with the integrated circuit chips dedicated for the electronic money application included in the process cartridge.

The electronic money application unit of the process cartridge may further include a data input and output port for electrically connecting to an electronic money integrated circuit card so that the electronic money application unit communicates for the monetary information with the electronic money integrated circuit card.

The monetary information handled by the electronic money application unit of the process cartridge may include property information for identifying the process cartridge.

The property information included in the monetary information may include a part number, a manufacturing number, and a price of the process cartridge.

The electronic money application unit of the process cartridge may further include a battery for allowing the electronic money application unit to communicate for the monetary information with the electronic money integrated circuit card via the data input and output ports.

The above-described image forming apparatus may further include a communication mechanism configured to perform communication for the monetary information using the integrated circuit chip dedicated for the electronic money application with an external host computer located at a remote control center.

The external host computer may store a data base holding history information for a plurality of image forming apparatuses.

The communication mechanism may perform the communications with the external host computer at each predetermined time of a day or on as-needed basis via a telephone network or via the Internet using Internet functions of E-main or a file transfer protocol.

The present application further describes a novel information control system. In one example, a novel information control system includes an image forming apparatus and an external host computer. The image forming apparatus includes a control unit, a data input and output port, a process cartridge, a memory, and a first communications mechanism. The control unit includes an integrated circuit chip dedicated for an electronic money application. The data input and output port is configured to exchange monetary information via the integrated circuit chip. The process cartridge includes an electronic money application unit including another integrated circuit chip dedicated for the electronic money application. The first communication mechanism is configured to perform communications for the monetary information. The external host computer is located at a remote control center and includes a data base and a second communications mechanism. The data base stores history information for a plurality of image recording apparatuses including the image forming apparatus. The second communications mechanism is configured to perform communications for the monetary information. In the above-described information control system, the image forming apparatus and the external host computer establish a communication connection with a specific address predetermined by the remote control center. The image forming apparatus generates configuration information of the image forming apparatus, stores it in the memory, and sends it to the host computer through the communication connection. The host computer generates a certified configuration information by adding a certification code to the configuration information sent from the image forming apparatus, stores it in the data base at the specific address, and sends the certified configuration information back to the image forming apparatus. The image forming apparatus updates the configuration information with the certified configuration information received from the host computer after verification of it with the configuration information stored in the memory. The image forming apparatus sends a request for communications for the monetary information with the certified configuration information. The host computer approves the request for communications for the monetary information requested by the image forming apparatus by verifying the certified configuration information sent from the image forming apparatus with the certified configuration information stored in the data base.

The control unit may generate the configuration information using the integrated circuit chips installed in the control unit and the process cartridge.

The host computer may generate new certified configuration information each time it approves the request for communications requested by the image forming apparatus. In this case, the new certified configuration information generated is different from the one previously generated and the image forming apparatus updates the newly generated certified configuration information after the communications for the monetary information is completed.

The host computer may control the history information of the image forming apparatus in association with the newly generated certified configuration application and afterwards accepts the request for communications when receiving it with the newly generated certified configuration application from the image forming apparatus.

The history information may include apparatus history information including a cumulative number of prints performed, a cumulative amount of consumable items consumed, configuration of optional equipment, and errors that have occurred.

The history information may include customer history information including names of users and a cumulative number of prints performed per each user.

The present application further describes a novel information control method. One example, a novel information control method includes the steps of providing, placing, establishing, generating, storing, sending, creating, writing, transferring, updating, transmitting, and approving. The providing step provides an image forming apparatus which includes a control unit, a data input and output port, a process cartridge, a memory, and a first communication mechanism. The control unit includes an integrated circuit chip dedicated for an electronic money application. The data input and output port is configured to exchange monetary information via the integrated circuit chip. The process cartridge includes an electronic money application unit including another integrated circuit chip dedicated for the electronic money application. The first communication mechanism is configured to perform communications for the monetary information. The placing step places an external host computer located at a remote control center. Such an external host computer includes a data base and a second communications mechanism. The data base stores history information for a plurality of image recording apparatuses including the image forming apparatus. The second communications mechanism is configured to perform communications for the monetary information. The establishing step establishes a communication connection between the image forming apparatus and the external host computer establish with a specific address predetermined by the remote control center. The generating step generates configuration information of the image forming apparatus. The storing step stores the configuration information in the memory. The sending step sends the configuration information to the host computer through the communication connection. The creating step creates a certified configuration information by adding a certification code to the configuration information sent from the image forming apparatus. The writing step writes the certified configuration information in the data base at the specific address. The transferring step transfers the certified configuration information back to the image forming apparatus. The updating step updates the configuration information stored in the memory with the certified configuration information received from the host computer after verification with the configuration information stored in the memory. The transmitting step transmits a request for communications for the monetary information with the certified configuration information. The approving step approves the request for communications for the monetary information transmitted from the image forming apparatus by verifying the certified configuration information transferred from the image forming apparatus with the certified configuration information written in the data base.

The generating step may generate the configuration information using the integrated circuit chips mounted in the control unit and the process cartridge.

The above-described information control method may further include steps of generating new certified configuration information each time the approving step approves the request for communications transmitted from the image forming apparatus. In this case, the certified configuration information newly generated is different from the one previously generated. Further, the above-described information control method may update the newly generated certified configuration information after the communications for the monetary information is completed.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

Figure 1:
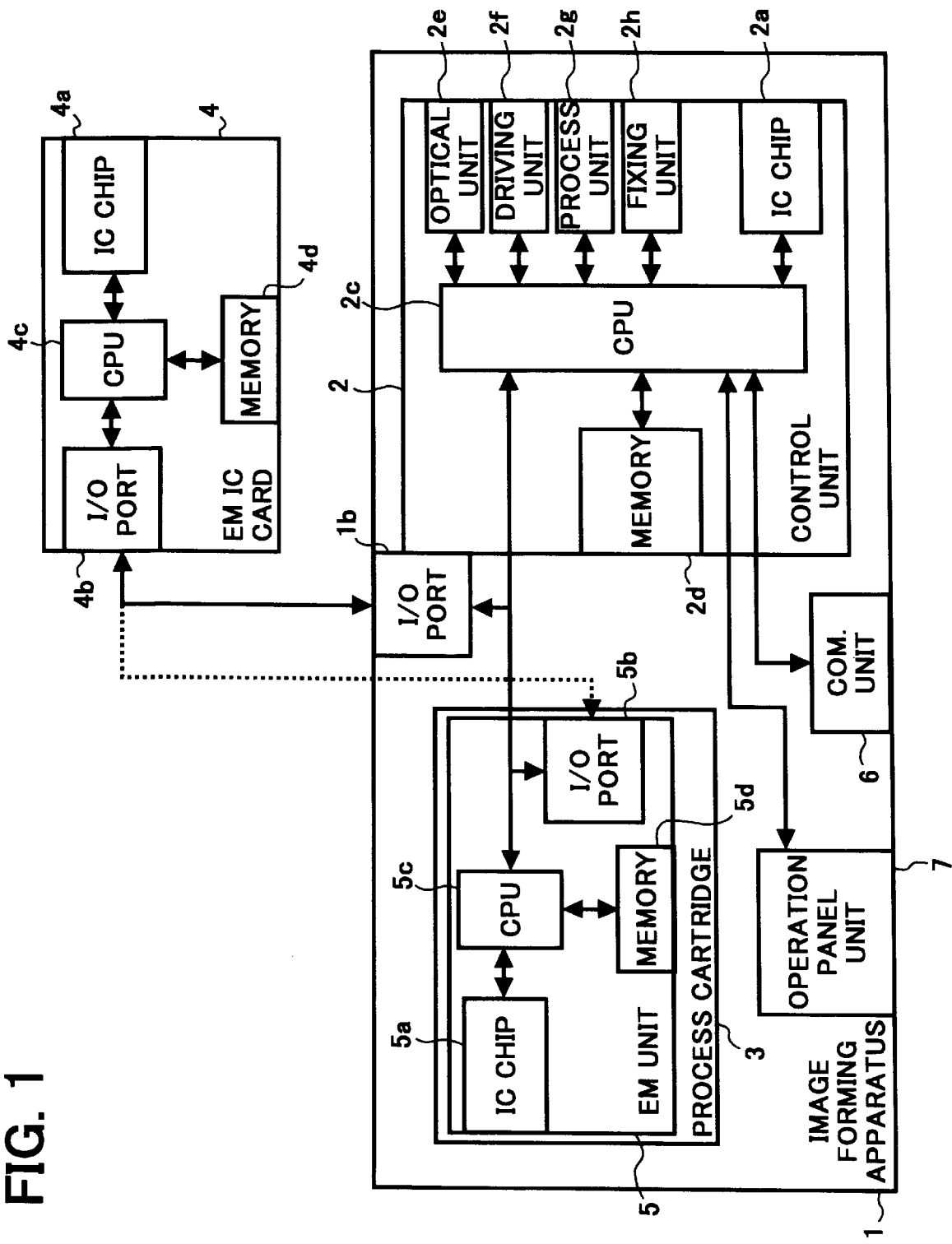
FIG. 1 is a schematic block diagram of an image forming apparatus according to a preferred embodiment.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numeral designate identical or corresponding parts throughout the several views, particularly to FIG. 1, a block diagram of an image forming apparatus 1 according to a preferred embodiment is described. The image forming apparatus 1 includes a data input/output port 1b, a control unit 2, a process cartridge 3, a communication unit 6, and an operation panel unit 7. In the following description, the term "input/output" may be referred to as I/O.

The data input/output port 1b is configured to be connected to an electronic money IC (integrated circuit) card 4 which includes an electronic money IC (integrated circuit) chip 4a, a data input/output port 4b, a CPU (central processing unit) 4c, and a memory 4d. The electronic money IC chip 4a handles electronic money information. In the following description, the term "electronic money" may be referred to as EM.

The control unit 2 includes an electronic money IC (integrated circuit) chip 2a, a CPU (central processing unit) 2c, a memory 2d, an optical unit 2e, a driving unit 2f, a process unit 2g, and a fixing unit 2h. The electronic money IC chip 2a handles electronic money information. The optical unit 2e controls laser light for forming a latent image on a photoconductive member in an image forming process of the image forming apparatus 1. The driving unit 2f controls a transfer of a recording sheet. The process unit 2g controls a process in which the latent image formed with the optical unit 2e is developed with toner and is transferred onto the recording sheet. The fixing unit 2h controls a fixing process for fixing the toner image on the recording sheet.

The process cartridge 3 includes an electronic money unit 5 which has a configuration similar to that of the electronic money IC card, as shown in FIG. 1, and which includes an electronic money IC (integrated circuit) chip 5a, a data input/output port 5b, a CPU (central processing unit) 5c, and a memory 5d. The process cartridge 3 is configured to be detachable from the image forming apparatus 1. The electronic money IC chip 5a handles electronic money information.

The communications unit 6 is connected to a communications network, such as a public switched telephone network (PSTN), a local area network (LAN), a wide area network (WAN), the Internet, etc., and performs data communications with a data terminal such as a PC (personal computer) through the communications network under the control of the CPU 2c of the control unit 2. The operation panel unit 7 includes various person-machine interface components (not shown), such as an alphanumeric-key pad, an LCD (liquid crystal display), functions keys, etc., for exchanging commands and responses between the operator and the CPU 2c.

Figure 2:
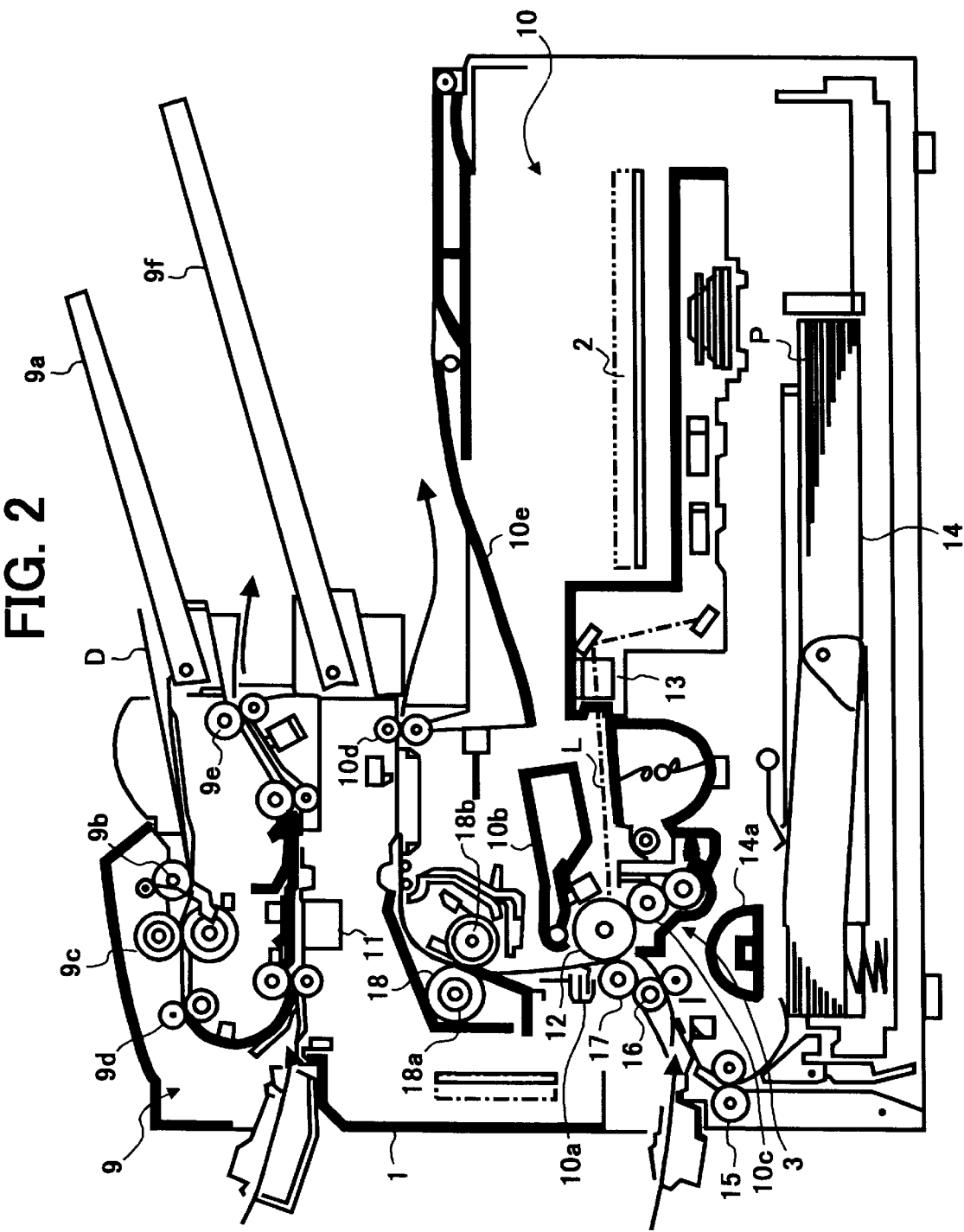
FIG. 2 is a cross-sectional view of the image forming apparatus of FIG. 1.

As illustrated in FIG. 2, the image forming apparatus 1 includes an original reading section 9 at an upper part thereof and an electrophotographic image forming section 10 at a mid part thereof. In the original reading section 9, an original D is placed on an original input table 9a and is input by a pickup roller 9b into an original separation unit 9c which is configured to separate the original D one by one with a feed roller and a reverse roller. The separated original D is transferred with a plurality of transfer rollers 9d to an original reading sensor 11 which reads the original D. After passing by the original reading sensor 11, the original D is further transferred and is ejected by an ejection roller 9e to an original ejection tray 9f.

The image forming section 10 uses an electrophotographic method and includes a photoconductive member 12 and, around the photoconductive member 12, several components such as a charging unit 10a, a development unit 10b, a transfer roller 17, a cleaning unit 10c included in the process cartridge 3. The photoconductive member 12 is arranged to be exposed to laser light L generated by a laser optical system unit 13 in accordance with image data.

In the image forming process, a recording sheet P contained in a sheet cassette 14 is picked up by a feed roller 14a and is transferred by a transfer roller 15 to a registration roller 16. The registration roller 16 transfers the recording sheet P to a nip portion formed between the photoconductive member 12 and the transfer roller 17 in synchronism with the rotation of the photoconductive member 12, wherein a latent image formed by an exposure with the laser light L is developed into a visible image with toner on the photoconductive member 12. The toner image formed on the photoconductive member 12 is then transferred onto the recording sheet P by the transfer roller 17. After that, the recording sheet P is transferred to a fixing unit 18 which fixes the toner image with heat and pressure using a heat roller 18a and a pressure roller 18b. The recording sheet P thus having the fixed toner image thereon is further transferred to an ejection roller 10d and is ejected by the ejection roller 10d to a recording sheet ejection tray 10e.

The entire control of the image forming apparatus 1 including a control of the above-described sequential operations performed by the original section 9 and the image forming section 10 is executed by an electric control system included in the control unit 2 containing various electric components such as a an electrical power supply (battery) and a plurality of integrated circuits.

Figure 3:
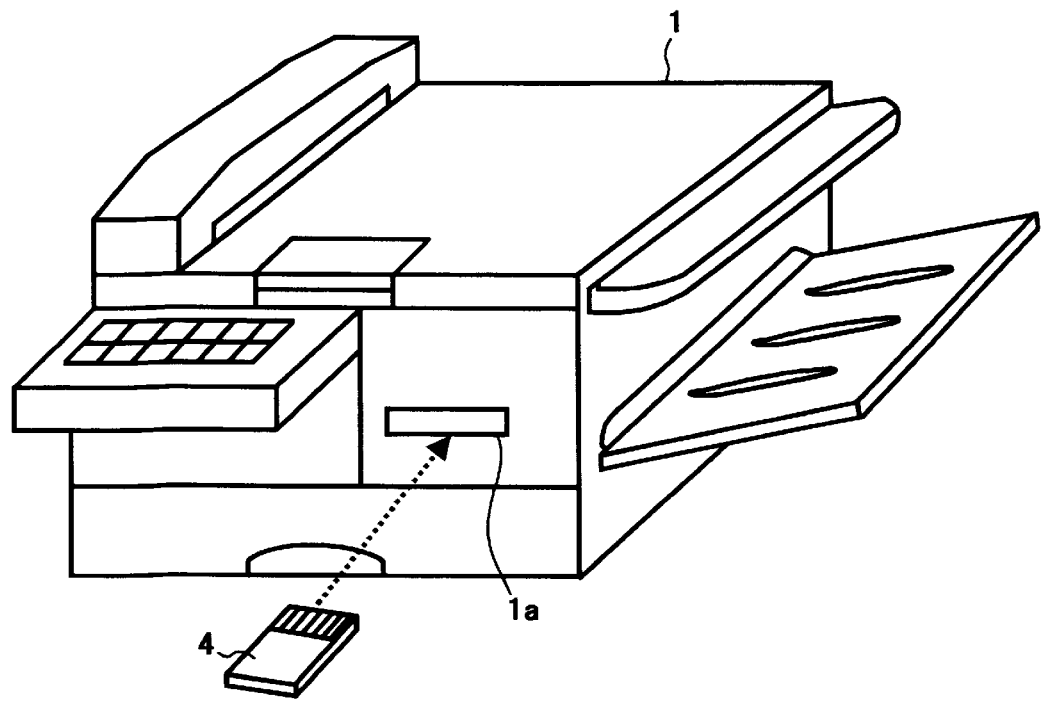
FIG. 3 is an illustration for showing an IC card inlet of the image forming apparatus of FIG. 1.

As shown in FIG. 3, the image forming apparatus 1 includes an electronic money IC (integrated circuit) card inlet 1a for receiving the EM IC card 4. When the EM IC card 4 is inserted into the IC card inlet 1a, the data input/output port 4b (FIG. 1) is connected to the data input/output port 1b and data exchange therebetween is thereby made possible.

Therefore, the thus-configured image forming apparatus 1 can exchange various kinds of information with the EM IC card 4 when the EM IC card 4 is inserted into the IC card inlet 1a of the image forming apparatus 1. For example, payment of a fee for exchanging a consumable item such as toner or a maintenance part requiring a periodic exchange, which may be determined in accordance with a number of prints, for example, may be executed through the above card operation.

Also, with the EM unit 5 provided to the process cartridge 3 (FIG. 1), the process cartridge 3 can handle the monetary information and the payment of fee for the process cartridge 3 or other fees associated with a recycle work related to the process cartridge 3.

The data input/output port 1b (FIG. 1) may be combined with the data input/output port 5b and, in this case, the combined data input/output port 5b is positioned next to the EM IC card inlet 1a (FIG. 3).

The EM IC card 4 may handle various kinds of monetary information including the information indicating an amount of money and various kinds of property information such as an identification for identifying an owner of the EM IC card 4, etc. The EM unit 5 of the process cartridge 3 handles various kinds of property information such as a part number or a type number for identifying the process cartridge 3, a manufacturing number, functional information such as a number of effective prints with the process cartridge 3, physical dimensions, etc., and price information representing a price of the process cartridge 3. When the process cartridge 3 is installed in the image forming apparatus 1, the image forming apparatus 1 receives the above various kinds of information from the EM unit 5 of the process cartridge 3. With the information received from the EM unit 5, the image forming apparatus 1 can automatically proceed the payment of an expense of the process cartridge 3 and suitably adjust the conditions for the image forming process.

When the process cartridge 3 is removed from the image forming apparatus 1 at a time of the periodic exchange, the monetary information is stored in the EM unit 5. In this case, the monetary information includes money information such as a recycle fee and so on and information for authorizing an exchange of the money information, as well as history information related to the process cartridge 3 and to the user and information useful for the recycle work.

Figure 4:
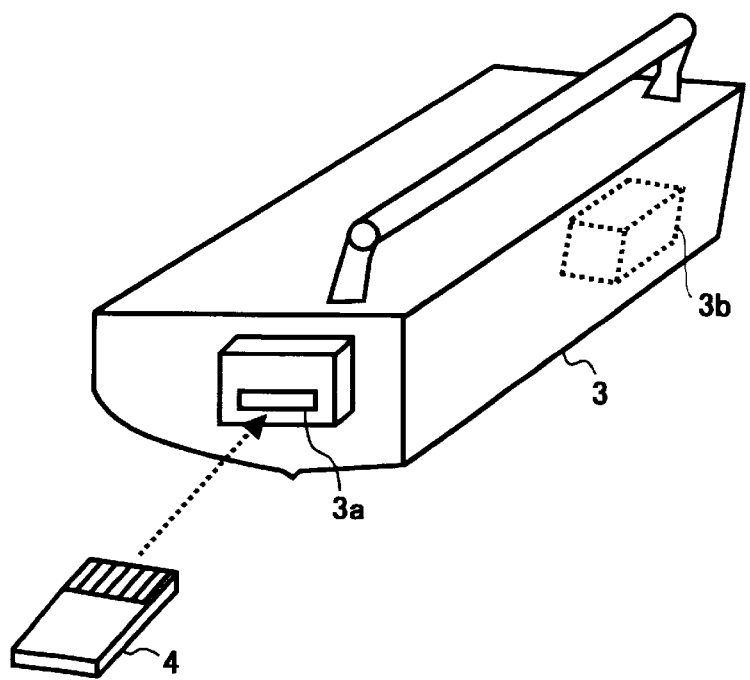
FIG. 4 is an illustration for showing an IC card inlet of a process cartridge of the image forming apparatus of FIG. 1.

The process cartridge 3 removed from the image forming apparatus 1 is subjected to an exchange of the monetary information with the EM IC card 4. For this purpose, the process cartridge 3 has an IC (integrated circuit) card inlet 3a, as shown in FIG. 4, through which the EM IC card 4 is inserted and the data input/output port 4b of the EM IC card 4 is connected to the data input/output port 5b. When the EM IC card 4 is connected to the process cartridge 3, the EM IC card 4 is first checked if it is a proper card with the information for authorizing an exchange of monetary information. If the EM IC card 4 is proved as a proper card, the monetary information is exchanged. The EM unit 5 of the process cartridge 5 is provided with a backup battery 3b, as shown in FIG. 4, for storing the monetary information for a relatively long time period and performing the exchange of the various information, etc. This backup battery 3b may be charged during the time when it is installed in an operable condition in the image forming apparatus 1.

The process cartridge 3 removed from the image forming apparatus 1 may be collected by a recycle company, for example, and, at the recycle company, the process cartridge 3 can be subjected to an exchange of the monetary information with an apparatus having a function similar to that of the EM IC card 4. The money information may be sent to a host computer of an accounting section of the recycle company so as to be used for invoicing, and the property information may be sent to a host computer of a work shop of that company so that a recycle work may be conducted in accordance with the history information, for example.

The communication unit 6 of the image forming apparatus 1 is configured to transmit and receive the monetary information at a relatively high speed so that transaction of monetary information can be quickly processed. With this feature, the image forming apparatus 1 can send the monetary information on an as-needed basis to, for example, a control center which deals with the image forming apparatuses at an one-by-one basis. Such a control center can collect the user information according to the property information included in the monetary information, control an inventory of necessary parts and consumable items according to the contents of the property information, and control a history of individual apparatus according to the property information representing the machine history, the machine configuration, etc.

The communication unit 6 performs the communications of the monetary information with the control center in response to a demand raised by the image forming apparatus 1. For example, the communication unit 6 performs the communications when the image forming apparatus 1 receives the monetary information from the EM IC card 4 and needs to perform the transaction of the monetary information. For another example, the communication unit 6 performs the communications when the image forming apparatus 1 receives the monetary information from the process cartridge 3 after an exchange of the process cartridge 3 at a periodic exchange occasion.

The image forming apparatus 1 may perform the above communications of the monetary information with the control center through the communication unit 6 during a time of a self-diagnostic test at a power-on time, during a specific time of a day when the image forming apparatus 1 is less occupied with the image forming operation, or at a time immediately before the power of the image forming apparatus 1 is shut down.

The image forming apparatus 1 may use various kinds of networks including the Internet for the communications with the communication unit 6. When the Internet is used, the image forming apparatus 1 uses E-mail or an FTP (file transfer protocol) function. Thereby, the image forming apparatus 1 performs quick communications of the monetary information utilizing various popular software products, without a need of establishing a new network system and software.

Figure 5:
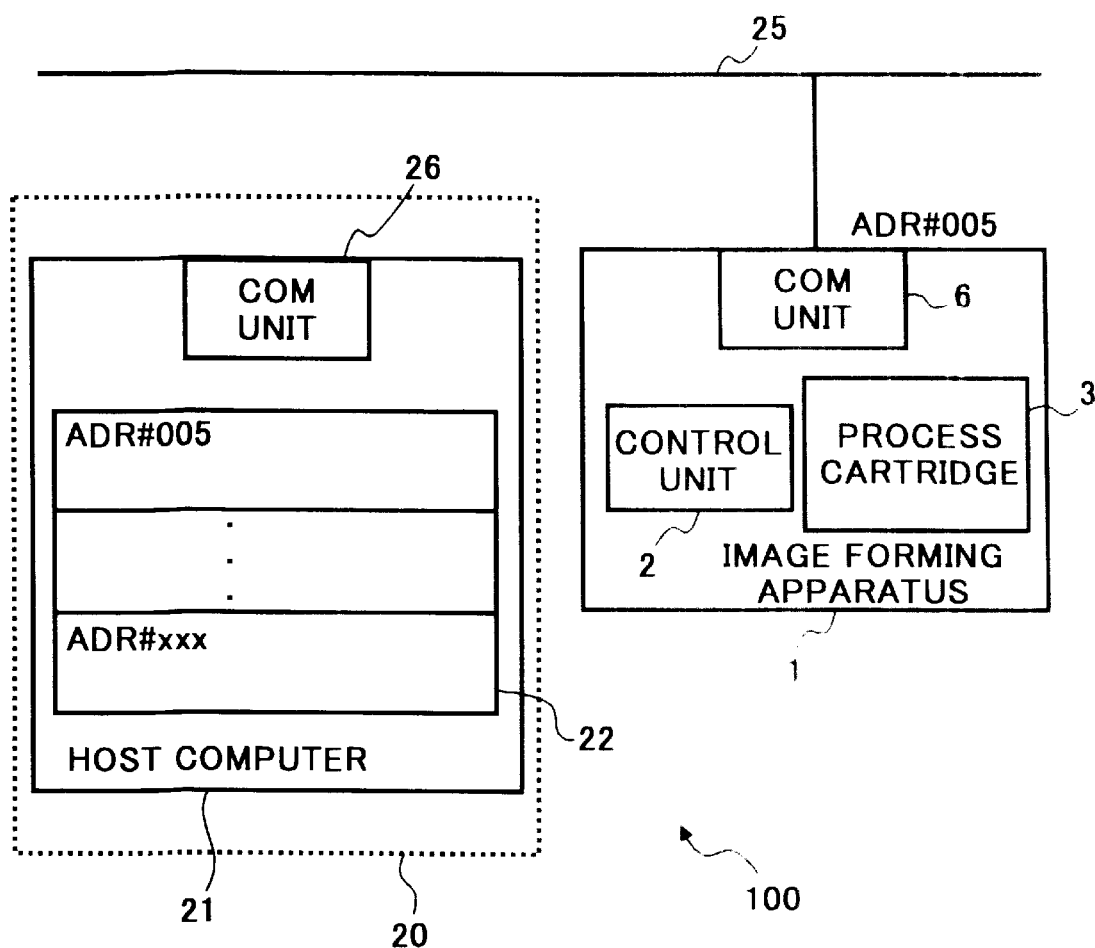
FIG. 5 is a schematic block diagram of a monetary information control system according to a preferred embodiment.

Referring now to FIG. 5, a control system of the monetary information according to a preferred embodiment is explained. A monetary information control system 100 includes a control center 20 and a plurality of image forming apparatus which are provided with a configuration similar to that of the image forming apparatus 1 of FIG. 1 and communicate with the control center 20. For convenience sake, the image forming apparatus 1 is shown in FIG. 5 as a representative of the plurality of the image forming apparatus.

As shown in FIG. 5, the monetary information control system 100 includes a host computer 21 which includes a data base 22 of history information and a communication unit 26 for performing communication with the communication unit 6 of the image forming apparatus 1 via a network 25. The data base 22 includes a plurality of history information sectors for the image forming apparatuses. Each sector stores history information of a specific image forming apparatus. For example, a sector labeled with the address ADR#005 stores the history information of the image forming apparatus 1.

In the monetary information control system 100, the image forming apparatus 1 is provided with a specific address, ADR #005, for example, as shown in FIG. 5, by the control center 20 when the image forming apparatus 1 is installed and a line connection for communications between the image forming apparatus 1 and the host computer 21 is established with this specific address. When the line connection is established using the address ADR#005 between the image forming apparatus 1 and the host computer 21, the image forming apparatus 1 can read and write history information relative to the address ADR#005 in the data base 22 of the host computer 21.

Figure 6:
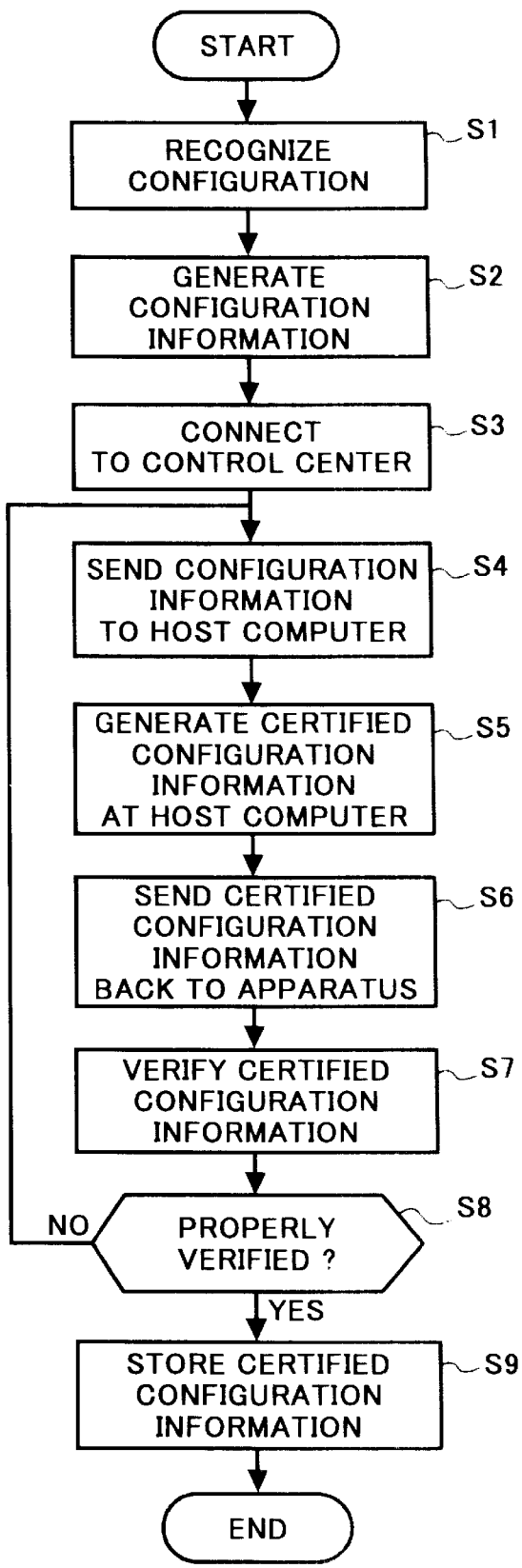
FIG. 6 is a flowchart for explaining an exemplary procedure of an initial setting operation performed by the image forming apparatus of FIG. 1.

As described above, the image forming apparatus 1 is provided with information used in the process for obtaining authorization of monetary information communications. Referring to FIG. 6, an exemplary procedure of an initial setting operation performed by the image forming apparatus 1 for authorization of monetary information communications is explained.

In Step S1 of FIG. 6, the CPU 2c of the control unit 2 in the image forming apparatus 1 reads and recognizes a machine configuration and an address ADR#005 provided by the control center 20 when power is supplied to the image forming apparatus 1 for the first time after its installation. In Step S2, the CPU 2c generates configuration information based on the machine configuration. The configuration information is stored in the memory 2d. In Step S3, the CPU 2c instructs the communication unit 6 to connect to the host computer 21 using the address ADR#005. In Step S4, the CPU 2c sends the configuration information to the host computer 21 via the communication units 6 and 26.

Figure 7:
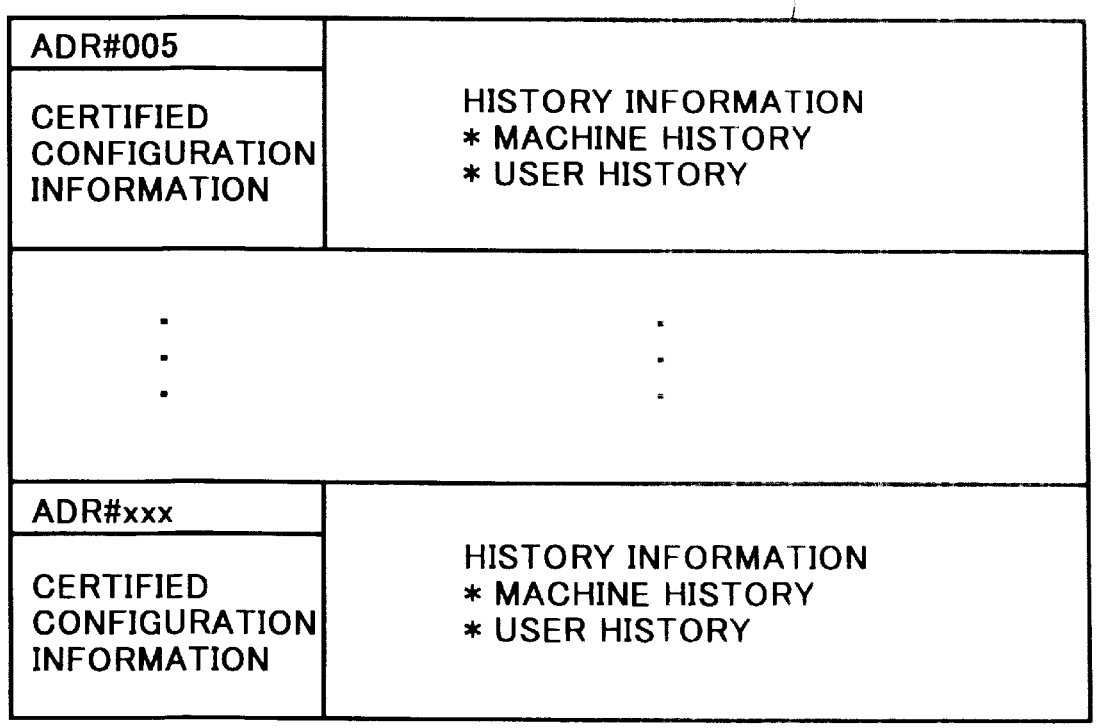
FIG. 7 is an illustration for showing an example of the contents of a data base held in a host computer at a control center.

In Step S5, the host computer 21 generates certified configuration information by adding an authorization code to the configuration information received from the image forming apparatus 1. The authorization code is calculated by the host computer 21 based on specific rules determined by the control center 20. The certified configuration information is stored in the data base 22 at an address assigned in association with the address ADR#005. FIG. 7 shows an example of the contents of the data base 22. In Step S6, the host computer 21 sends the certified configuration information to the image forming apparatus 1.

In Step S7, upon a receipt of the certified configuration information sent from the host computer 21, the CPU 2c of the control unit 2 in the image forming apparatus 1 verifies the certified configuration information with the configuration information stored in the memory 2d. In Step S8, the CPU 2c determines if the configuration is properly verified in Step S7. If the configuration is not properly verified in Step S7 and the determination result of Step S8 is NO, the CPU 2c returns the process to Step S4 to repeat the above-described procedure until the configuration is properly verified. If the configuration is properly verified in Step S7 and the determination result of Step S8 is YES, the CPU 2c proceeds the process to Step S9 in which the CPU 2c stores the certified configuration information into the memory 2d. Then, the CPU 2c ends the process.

Figure 8:
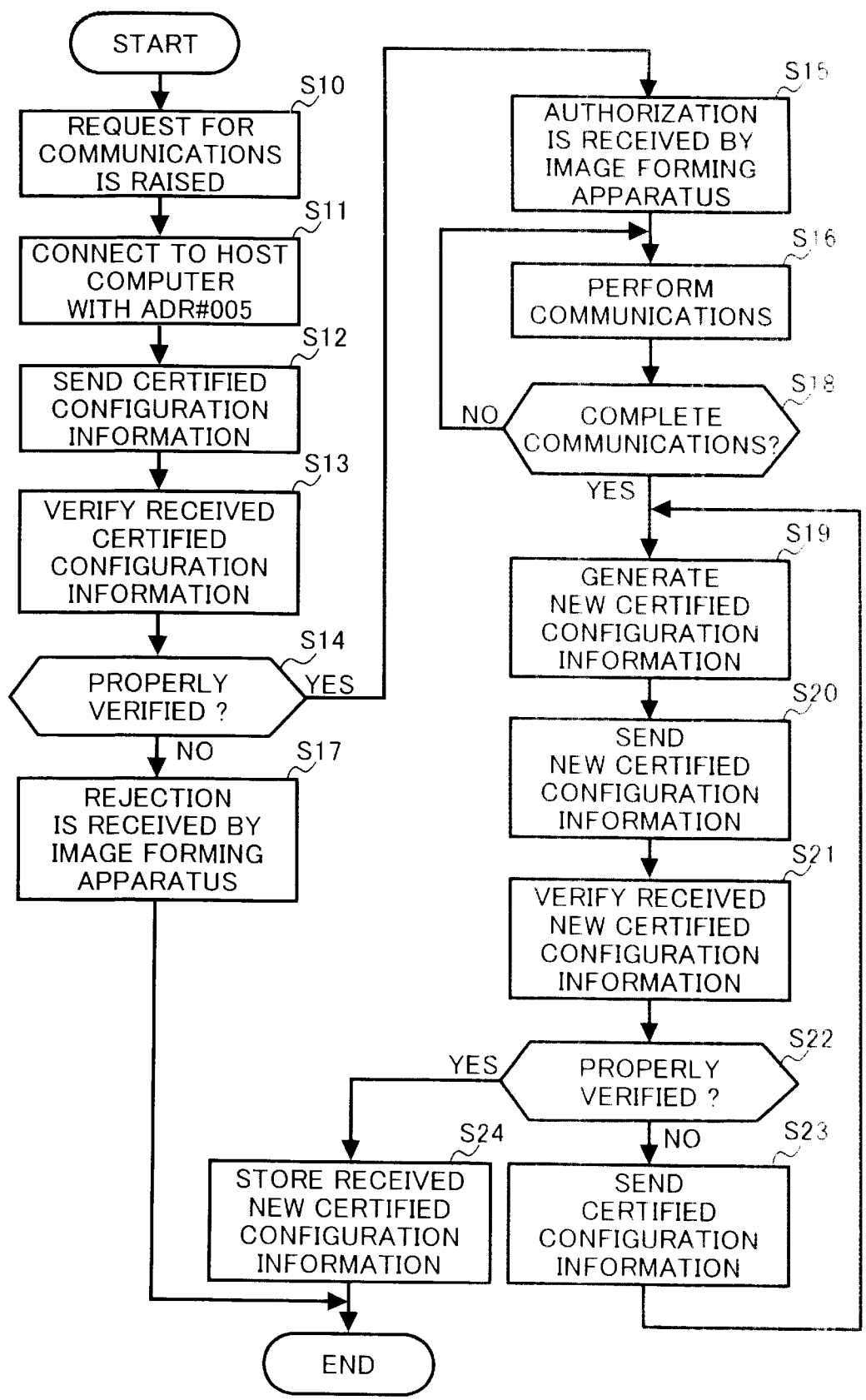
FIG. 8 is a flowchart for explaining an exemplary authorization procedure when a request for communication is raised by the image forming apparatus of FIG. 1.

Referring to FIG. 8, an exemplary authorization procedure when a request for communication is raised by the image forming apparatus 1 is explained. In the monetary information control system 100, the image forming apparatus 1 raises a request for communication to exchange the monetary information and the history information when a payment transaction has occurred in the image forming apparatus 1, when the process cartridge 3 is exchanged, when the recycle work is performed, and so on. In Step S10 of FIG. 8, the CPU 2c generates a request for communication. In Step S11, the CPU 2c instructs the communication unit 6 to connect to the host computer 21 using the address ADR#005. In Step S12, the CPU 2c sends the certified configuration information stored in the memory 2d to the host computer 21.

In Step S13, the host computer 21 verifies the certified configuration information sent from the image forming apparatus 1 with the information stored in the data base at the address ADR#005. In Step S14, the host computer 21 determines if the certified configuration information is properly verified. The host computer 21 sends authorization to the image forming apparatus 1 if the certified configuration information is properly verified and the determination result of Step S14 is YES, or rejection if the certified configuration information is not properly verified and the determination result of Step S14 is NO. In the case of rejection, the CPU 2c of the control unit 2 of the image forming apparatus 1 receives the rejection sent from the host computer 21 and displays a message indicating that the request for communication is rejected through the operation panel unit 7, in Step S17. Then, the process ends.

In Step S15, the CPU 2c receives the authorization sent from the host computer 21. In Step S16, the CPU 2c starts the communications for exchanging the monetary information with the host computer 21. In Step S18, the host computer 21 checks if the communications for the monetary information with the image forming apparatus 1 is completed. The check of Step S18 forms a NO loop to return to Step S16 unless the check result becomes YES.

If the communications with the image forming apparatus 1 is completed and the check result of Step S18 is YES, the host computer 21 generates new certified configuration information by adding new authorization code to the previous certified configuration information, in Step S19. In Step S20, the host computer 21 sends the new certified configuration information to the image forming apparatus 1.

In Step S21, the image forming apparatus 1 verifies the new certified configuration information sent from the host computer 21 with the certified configuration information stored in the memory 2d. In Step S22, the CPU 2c determines if the new certified configuration information is properly verified in Step S21. If the new certified configuration information is not properly verified and the determination result of Step S22 is NO, the CPU 2c sends the certified configuration information to the host computer 21, in Step S23, and the process then returns to Step S19 to repeat the above-described operations until the new certified configuration information is properly verified.

If the new certified configuration information is properly verified and the determination result of Step S22 is YES, the CPU 2c updates the configuration information with the new certified configuration information in the memory 2d, in Step S24. Then, the process ends.

In this way, the monetary information control system 100 can allow the host computer to properly identify an apparatus (i.e., the image forming apparatus 1) that requests communications for exchanging monetary information by executing revision and confirmation of the certified configuration information given to the apparatus each time when the host computer receives such request. Thereby, the monetary information control system 100 can achieve a relatively high level information security.

Figure 9:
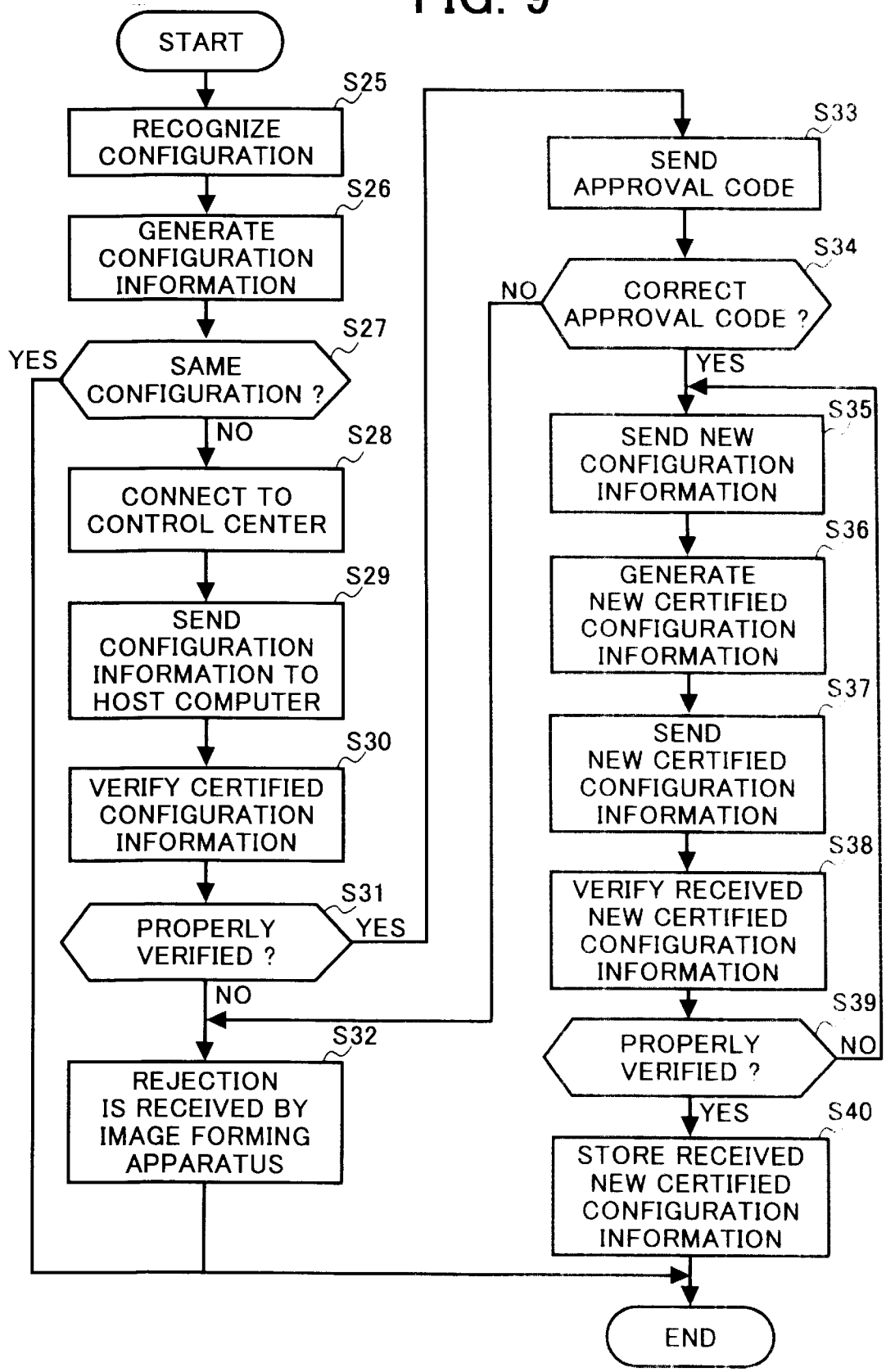
FIG. 9 is a flowchart for explaining an exemplary procedure for authorizing the communications when the image forming apparatus of FIG. 1 changes its configuration.

Referring to FIG. 9, an exemplary procedure for authorizing communications when the image forming apparatus 1 changes its configuration is explained. In this case, an approval code for allowing a configuration change is predefined and is prestored in the history information.

In Step S25 of FIG. 9, the CPU 2c of the control unit 2 in the image forming apparatus 1 recognizes the configuration through the self-diagnostic at a power-on time. In Step S26, the CPU 2c generates configuration information and temporarily stores it in the memory 2d. In Step S27, the CPU 2c checks if the generated configuration information is identical to the previous configuration information (previous certified configuration information). If the generated configuration information is identical to the previous configuration information and the check result of Step S27 is YES, the process ends. If the generated configuration information is not identical to the previous configuration information and the check result of Step S27 is NO, the process proceeds to Step S28 in which the CPU 2c connect to the host computer 21 with the address AR#005. In Step S29, the CPU 2c sends the previous certified configuration information to the host computer 21. In Step S30, the host computer 21 verifies the configuration information (previous certified configuration information) sent from the image forming apparatus 1 with the configuration information (previous certified configuration information) stored in the data base at ADR#005. In Step S31, the host computer 21 determines if the above verification is completed successfully. If the host computer 21 fails in the above verification and the check result of Step S31 is NO, the host computer 21 sends rejection to the image forming apparatus 1. In Step S32, the image forming apparatus 1 receives the rejection of the communications and displays a message indicating that the request for communication is failed, through the operation panel unit 7. Then, the process ends.

If the host computer 21 succeeds in executing the above verification and the check result of Step S31 is YES, the host computer 21 sends authorization for the communications to the image forming apparatus 1. In Step S33, after the image forming apparatus 1 receives the authorization sent from the host computer 21, the predefined approval code is entered through the operation panel unit 7 by the operator and the CPU 2c sends it to the host computer 21. As an alternative to sending the approval code, the operator may send identification information for identifying a specific card owner registered in the EM IC card 4. Further, the operator may send the above identification information with a predefined password for a configuration change.

In Step S34, the host computer 21 verifies the approval code sent from the image forming apparatus 1 and determines if the approval code is correct. If the approval code is incorrect and the determination result of Step S34 is NO, the process goes to Step S32 so as to send rejection of the communications to the image forming apparatus 1, as described above. If the approval code is correct and the determination result of Step S34 is YES, the host computer 21 sends confirmation of the approval code to the image forming apparatus 1. Then, in Step S35, upon a receipt of the acceptance sent from the host computer 21, the CPU 2c of the control unit 2 in the image forming apparatus 1 sends the new configuration information temporarily stored in the memory 2d in Step S26 to the host computer 21. In Step S36, upon a receipt of the new configuration information sent from the image forming apparatus 1, the host computer 21 generates new certified configuration information by adding a new certification code to the new configuration information received from the image forming apparatus 1 and stores it in the data base 22 at ADR#005. In Step S37, the host computer 21 sends the new certified configuration information to the image forming apparatus 1.

In Step S38, upon a receipt of the new certified configuration information sent from the host computer 21, the CPU 2c of the control unit 2 in the image forming apparatus 1 verifies the configuration information included in the new certified configuration information sent from the host computer 21 with the new configuration information stored in the memory 2d. In Step S39, the CPU 2c determines if the above verification is successfully completed. If the verification is not successfully completed and the determination result of Step S39 is NO, the process returns to Step S35 to repeat the above-described procedure until the verification is successfully completed. If the verification is successfully completed and the determination result of Step S39 is YES, the process proceeds to Step S40 and the CPU 2c updates the configuration information in the memory 2c with the new certified configuration information sent from the host computer 21.

In this way, the monetary information control system 100 can allow an apparatus (i.e., the image forming apparatus 1) to change its configuration and to implement such configuration change to the data base of the host computer without losing its relatively high level of information security. Therefore, the monetary information control system 100 can reasonably safely be used even with the Internet, for example.

Figure 10:
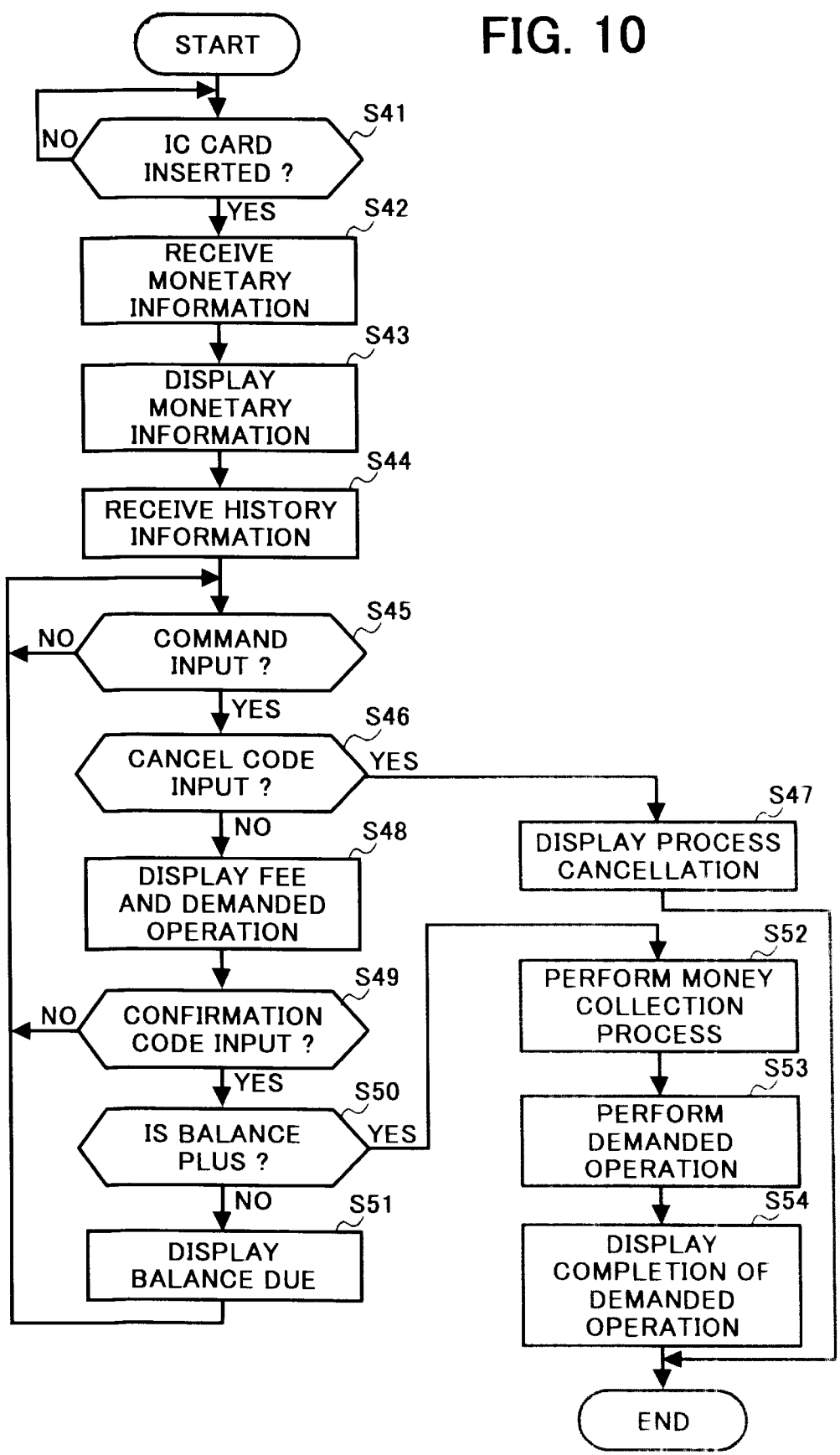
FIG. 10 is a flowchart for explaining an exemplary procedure of an automatic fee payment for image forming operations performed on the image forming apparatus of FIG. 1 using an electronic money IC card.

Referring to FIG. 10, an exemplary procedure of an automatic fee payment for the image forming operations performed on the image forming apparatus 1 using the electronic money IC card 4 is explained. In this case, a fee for one operation of the image forming is predefined and the fee is paid from the EM IC card 4 to the image forming apparatus 1.

In Step S41 of FIG. 10, the CPU 2c of the control unit 2 in the image forming apparatus 1 checks if the EM IC card 4 is inserted to the IC card inlet 1a of the image forming apparatus 1. The check of Step S41 forms a NO loop for holding the process until the EM IC card 4 is inserted. If the EM IC card 4 is inserted and the check result of Step S41, the CPU 2c receives the monetary information from the EM IC card 4, in Step S42. The monetary information includes a present amount of money remaining in the EM IC card 4, an owner's name for identifying a name of the owner of the EM IC card 4, and so on.

In Step S43, the CPU 2c displays the present amount of money and the owner's name received from the EM IC card 4 through the operation panel unit 7. With this process, the operator can confirm the contents of the EM IC card 4, such as the present amount of money, the card owner's name, etc.

In Step S44, the CPU 2c instructs the EM IC card 4 using the card owner's name to send the history of usage of the image forming apparatus 1. With this process, the various kinds of special services on the usage of the image forming apparatus 1 may be applied to the card owner. For example, the fee for the image forming operation per recording sheet may be discounted. As another example, certain conditions for the image forming operation, such as a sheet size, a sheet orientation, etc., may be preset for the user's convenience.

In Step S45, the CPU 2c checks if any input is made through the operation panel unit 7 by the user of the EM IC card 4. The check of Step S45 forms a NO loop for holding the process until an input is made. If the user gives a command through the operation panel unit 7 and the check result of Step S45 is YES, the CPU 2c further checks in Step S46 if the user has entered a cancel code for canceling the command input. If the user has put in a cancel code and the check result of Step S46 is YES, the CPU 2c displays a message indicating that the operation is canceled through the operation panel unit 7, in Step S47. Then, the process ends.

If the user puts in another code (i.e., a confirmation code) rather than a cancel code and the check result of Step S46 is NO, the process proceeds to Step S48. In Step S48, the CPU 2c displays the input command through the operation panel unit 7. Further, in Step S48, the CPU 2c calculates the fee to be charged for the image forming operations performed in accordance with the input command and the balance of the present amount of money remaining in the EM IC card 4 and the fee for the requested image forming operations. In the above calculations, if the user is applied with any discount described above, such a discount is taken into account. Further, in Step S48, the CPU 2c also displays the calculation result through the operation panel unit 7.

In Step S49, the CPU 2c checks if the user has put in a confirmation code for further proceeding with the operation. If the user has put in a code (i.e., a cancel code) than the confirmation code and the check result of Step S49 is NO, the process returns to Step S45 to repeat the above-described operations. If the user inputs the confirmation code and the check result of Step S49 is YES, the process proceeds to Step S50. In Step S50, the CPU 2c determines if the present amount of money remaining in the EM IC card 4 is greater than the fee for the demanded operations as a result of the balance calculation performed in Step S48. If the present amount is not greater than the fee for the demanded operations and the determination result of Step S50 is NO, the CPU 2c displays an amount of balance due through the operation panel unit 7, in Step S51, and returns to Step S45 to allow the user to change the command to input.

If the present amount is greater than the fee for the demanded operations and the determination result of Step S50 is YES, the CPU 2c performs a money collection process (Step S52) for collecting the money from the EM IC card 4 in accordance with the calculations performed in Step S48. In this process, the monetary information stored in the memory 4d of the EM IC card 4 is rewritten in accordance with the calculations performed by the CPU 2c of the control unit 2 in the image forming apparatus 1 in Step S48. In Step S53, the CPU 2c starts to perform the operation demanded by the user in Step S45 and instructs the CPU 4c of the EM IC card 4 to update the history information. Further, in Step S53, the CPU 2c send the history information to the host computer 21 of the control center 20 so as to update the data base at the address ADR#005. In Step S54, upon a completion of the demanded operation, the CPU 2c displays the completion of the demanded operation through the operation panel unit 7 and sends the monetary information to the host computer 21. The process then ends.

Figure 11:
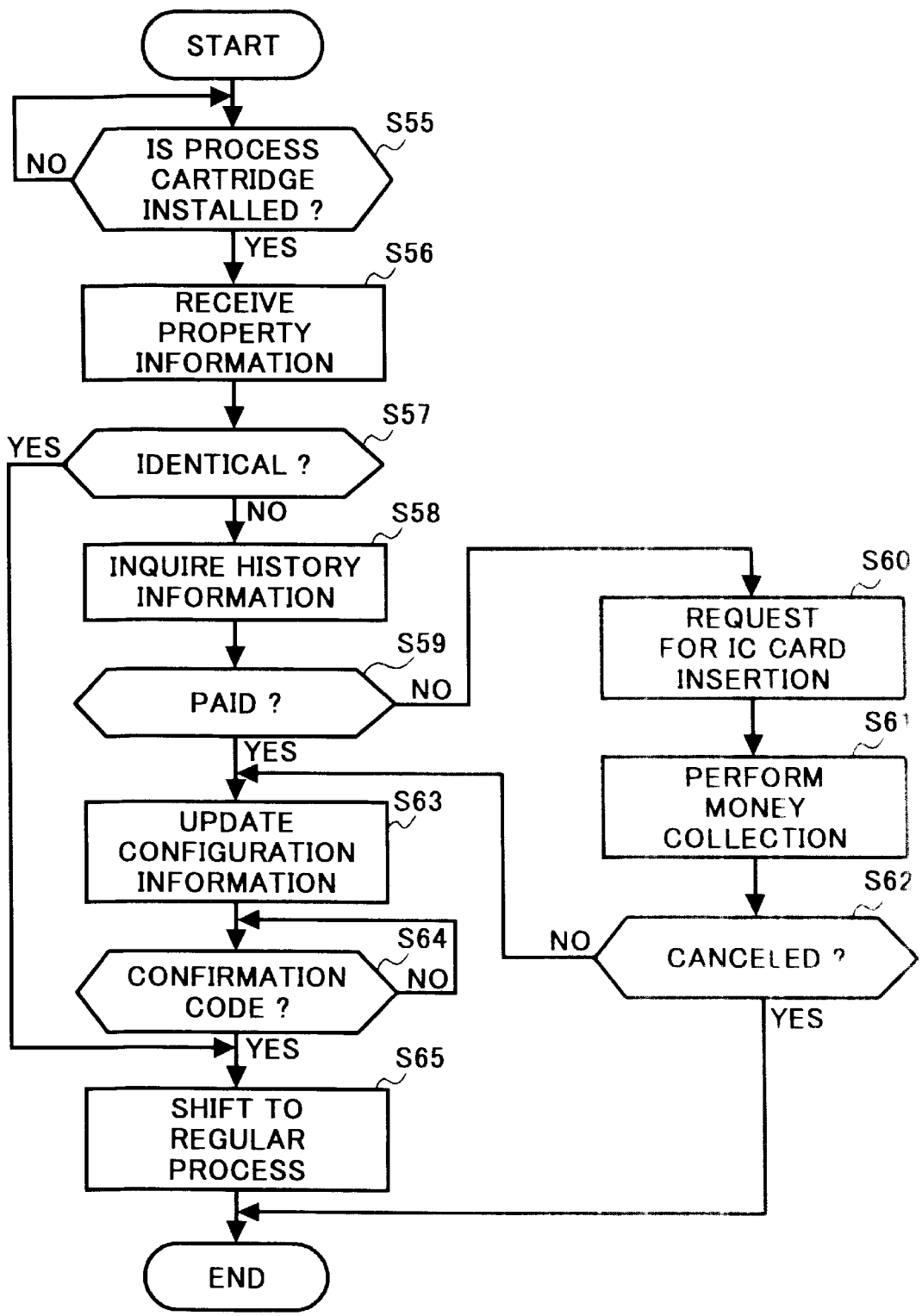
FIG. 11 is a flowchart for explaining an exemplary procedure of a control operation performed by the monetary information control system of FIG. 5 when a process cartridge is exchanged in the image forming apparatus of FIG. 1.

Referring to FIG. 11, an exemplary procedure of the control operation performed by the monetary information control system 100 when the process cartridge 3 is exchanged in the image forming apparatus 1 is explained. It is assumed that the image forming apparatus 1 is out of toner and therefore the process cartridge 3 containing a toner tank has been exchanged, for example. As another example, when the photoconductive member 12 is exchanged because its life time is ended, the procedure similar to the above will be taken place.

In Step S55 of FIG. 11, the CPU 2c checks if the new process cartridge 3 is installed in the image forming apparatus 1. The check of Step S55 forms a NO loop for holding the process until the new process cartridge 3 is installed. This process may be performed each power-on time, each time a toner end is detected or a life end of the photoconductive member is detected, or each time after some action is taken based on the above detection.

If the new process cartridge 3 is installed and the check result of Step S55 is YES, the CPU 2c receives the monetary information from the EM unit 5 of the new process cartridge 3, in Step S56. The CPU 2c mainly receives the property information from the monetary information. The property information includes a part number, a manufacturing number, and functional information which identify the process cartridge 3. The property information further includes price information indicative of a price of the process cartridge 3.

In Step S57, the CPU 2c verifies the property information received from the new process cartridge 3 with the property information of the previous process cartridge 3 contained in the configuration information which is stored in the memory 2d and determines if the verification is successfully completed. If the verification is successfully completed and the determination result of Step S57 is YES, the process proceeds to Step S65 in which the CPU 2c moves into the regular routine. Then, the process ends.

If the property information of the new process cartridge 3 is not properly verified with the property information of the previous process cartridge 3 and the determination result of Step S57 is NO, the CPU 2c sends an inquiry on the property information of the new process cartridge to the host computer 21 of the control center 20, in Step S58. In Step S59, the CPU 2c checks in the monetary information if the fee for the exchange of the process cartridge 3 is paid. If the fee is not paid and the check result of Step S59 is NO, the process proceeds to Step S60 in which the CPU 2c displays a message indicating that the process cartridge 3 has been exchanged and the user is requested to insert the EM IC card 4 to pay for the process cartridge 3.

In Step S61, the CPU 2c performs a money collection process. In the money collection process, the CPU 2c checks if the EM IC card 4 is inserted. If the EM IC card 4 is inserted, the CPU 2c receives the monetary information from the card 4. Then, the CPU 2c displays the card owner's name and the present amount of money remaining in the card 4. The CPU 2c calculates any discount in accordance with the history information. Then, the CPU 2c displays a message indicating that the process cartridge 3 has been exchanged and the calculated fee is collected, and wait for an input of a confirmation code by the user. If the process is cancelled at this time, the CPU 2c stops the process and proceeds to Step S62. If the process is confirmed, the CPU 2c determines if the calculated fee can be collected from the present amount of money remaining in the EM IC card 4 and, if the calculated fee is determined as can be collected, the CPU 2c performs the collection and proceed to Step S52.

In Step S62, the CPU determines if the process is cancelled in the above money collection process. If the process is cancelled and the determination result of Step S62 is YES, the process ends. If the process is not cancelled and the determination result of Step S62 is NO, the process proceeds to Step S63 in which the CPU 2 updates the configuration information in the memory 2d and displays a message indicating that the exchange of the process cartridge 3 has been completed. In Step S64, the CPU 2c checks if the user responds to the above display by inputting a confirmation code. The check of Step S64 forms a NO loop to wait until the user input the confirmation code. If the user inputs the confirmation code and the check result of Step S64 is YES, the CPU 2c moves into the regular routine. Then, the process ends.

In the check of Step S59, there are two cases which lead to a YES result. In a first case, the new process cartridge 3 is a recycled process cartridge 3 and the user has paid for it before the exchange operation. For such a case, the data base 22 in the host computer 21 may be generated based on the property information which is used for the registration of the property information to the EM unit 5 of the process cartridge 3. Since the history information such as the recycle history information can be included in the property information registered in the EM unit 5, the data base 22 thus can include such recycle history information. Thereby, it becomes possible for the CPU 2c by sending an inquiry of the monetary information to the host computer 21 to recognize that the payment for the process cartridge 3 is settled.

In a second case, the user holds a plurality of process cartridges 3 for some reason and uses it by exchanging one after another. For such a case, the configuration information for the image forming apparatus 1 registered in the data base 22 of the host computer 21 is arranged to includes a plurality of the identification information. When one of the process cartridges 3 is subjected to the recycle process, the identification information of such process cartridge 3 may be deleted from the configuration information for the image forming apparatus 1 registered in the data base 22.

Figure 12:
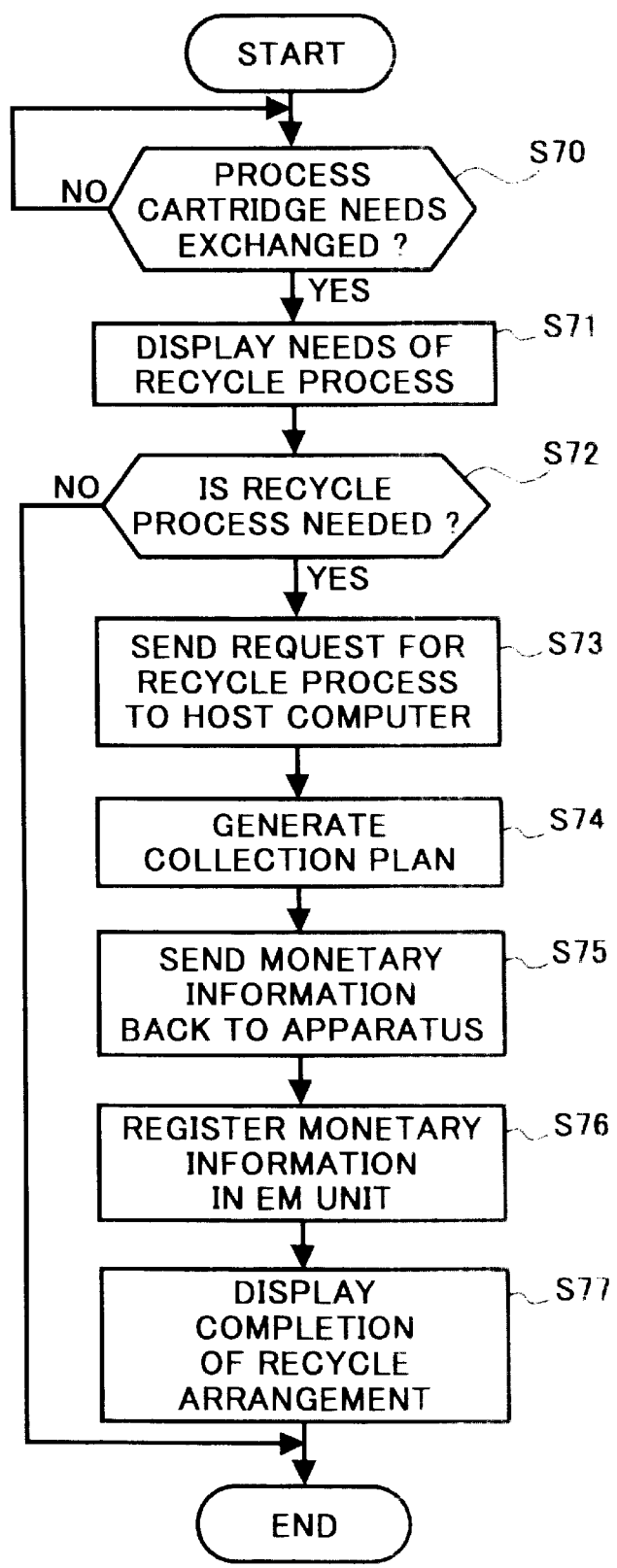
FIG. 12 is a flowchart for explaining another exemplary procedure performed when the process cartridge need to be exchanged.

Referring to FIG. 12, an exemplary procedure of the control operation performed by the monetary information control system 100 when the process cartridge 3 is exchanged for the recycle process in the image forming apparatus 1 is explained. It is assumed that the life time of the process cartridge 3, for example, is ended and therefore the process cartridge 3 is exchanged and is subjected to the recycle process. As another example, when the photoconductive member 12 is exchanged because its life time is ended, the procedure similar to the above will be taken place.

In Step S70 of FIG. 12, the CPU 2c of the control unit 2 in the image forming apparatus 1 checks if the process cartridge 3 needs to be exchanged. The check of Step S70 forms a NO loop to continue until the CPU 2c detects that the process cartridge 3 should be exchanged. If the process cartridge 3 should be exchanged and the check result of Step S70 is YES, the CPU 2c displays the need for a recycle process, in Step S71. In Step S72, the CPU 2c checks if the user inputs a confirmation code for confirming the performance of the recycle process. If the user inputs a code other than the confirmation code and the check result of Step S72 is NO, the CPU 2c ends the process. If the user inputs the confirmation code and the check result of Step S72 is YES, the CPU 2c proceeds to Step S73 and displays a message indicating that the recycle of the process cartridge 3 has proceeded. At the same time, the CPU 2c sends a request for a recycle process to the host computer 21.

In Step S74, upon a receipt of the recycle request sent from the image forming apparatus 1, the host computer 21 generates a plan for collecting the process cartridge 3 from the image forming apparatus 1 based on the information of a location of the image forming apparatus 1 and a location of the recycle work shop read from the history information and a schedule of transportation (e.g., a truck) for collection. At this time, the host computer 21 can search an inventory of other consumable items or parts held at the site of the image forming apparatus 1 and calculate when these consumable items or parts are in short supply and should be replenished. Therefore, it is possible for the host computer 21 to arrange a delivery of additional consumable items or parts, if needed as a part of the above collection plan.

In Step S75, the host computer 21 sends the monetary information generated as the money information or the property information, and the above collection plan to the image forming apparatus 1. As described above, the monetary information includes the history information, particularly, the recycle information, the fee information related to the recycle process, the information of an available collection company, and so on.

In Step S76, upon a receipt of the monetary information and the collection plan, the CPU 2c of the control unit 2 in the image forming apparatus 1 registers the monetary information to the EM unit 5. In Step S77, the CPU 2c displays through the operation panel unit 7 the plan for the collection of the process cartridge 3 and a message indicating that the arrangement of the recycle process for the process cartridge 3 is completed and therefore the user can proceed with the exchange of the process cartridge 3.

In this way, the monetary information control system 100 can improve the user convenience in handling the image forming apparatus 1 by implementing the automatic arrangement of the recycle process and the automatic payment process for the recycle process.

In addition, the above monetary information control system 100 can handle an automatic repair call to the control center 20 or to a specific repair center. In this case, it may be useful to cumulatively store the information indicative of machine usage such as a number of prints per day, measurement of the internal and environmental temperature and humidity, and so on in the data base 22 of the host computer 21 in the control center 20. The record of the above accumulative information can be used for repair as well as preventive maintenance.

The disclosed system and process may be conveniently implemented using a conventional general purpose digital computer programmed according to the teaching of the present specification, as will be apparent to those skilled in the computer art. Appropriate software coding can readily be provided by skilled programmers based on the teachings of the present disclosure, as will be apparent to those skilled in the software art. Various implementation may also use application specific integrated circuits and/or an appropriate network of conventional component circuits, as will be readily apparent to those skilled in the art.

Numerous additional modifications and variations are possible in light of the above teachings. It is therefore to be understood that within the scope of the appended claims, the present application may be practiced otherwise than as specifically described herein.

This application claims priority to Japanese patent application No. JPAP2000-035485 filed on Feb. 14, 2000 in the Japanese Patent Office, the entire contents of which are hereby incorporated by reference.

What is claimed as new and is desired to be secured by Letter Patent of the United States is:

1. An image forming apparatus, comprising:
    an image forming mechanism configured to perform an image forming operation for forming an image on a recording sheet;
    a process cartridge configured to contain material used to make said image visible, said process cartridge being detachably installed in said apparatus;
    a card inlet configured to receive an electronic money integrated circuit card, said card inlet including a data input and output port for connecting to said electronic money integrated circuit card when it is inserted in said card inlet including an integrated circuit chip dedicated to an electronic money application; and
    a controlling mechanism configured to control said image forming operation performed by said image forming mechanism, said controlling mechanism including an integrated circuit chip dedicated to said electronic money application, said controlling mechanism capable of communicating for monetary information with said electronic money integrated circuit card via said data input and output port.

2. An image forming apparatus, comprising:
    an image forming mechanism configured to perform an image forming operation for forming an image on a recording sheet;
    a process cartridge configure d to contain material used to make said image visible, said process cartridge being detachably installed in said apparatus, said process cartridge including an electronic money application unit which includes an integrated circuit chip dedicated to an electronic money application; and
    a controlling mechanism configured to control said image forming operation performed by said image forming mechanism, said controlling mechanism including an integrated circuit chip dedicated to said electronic money application, said controlling mechanism capable of communicating for monetary information with said process cartridge with said integrated circuit chips dedicated for said electronic money application.

3. An image forming apparatus as defined in claim 2, wherein s aid electronic money application unit of said process cartridge further includes a data input and output port for electrically connecting to an electronic money integrated circuit card to enable said electronic money application unit to communicate for said monetary information with said electronic money integrated circuit card.

4. An image forming apparatus as defined in claim 3, wherein said electronic money application unit of said process cartridge further includes a battery powering said electronic money application unit to communication for said monetary information with said electronic money integrated circuit card via said data input and output port.

5. An image forming apparatus as defined in claim 2, wherein said monetary information handled by said electronic money application unit of said process cartridge includes property information for identifying said process cartridge.

6. An image forming apparatus as defined in claim 5, wherein said property information included in said monetary information includes a part number, a manufacturing number, and a price of said process cartridge.

7. An image forming apparatus as defined in claim 2, further comprising a communication mechanism configured to perform communications for said monetary information using at least one of said integrated circuit chips dedicated for said electronic money application with an external host computer located at a remote control center.

8. An image forming apparatus as defined in claim 7, wherein said external host computer stores a data base holding history information for a plurality of image forming apparatuses.

9. An image forming apparatus as defined in claim 7, wherein said communication mechanism performs said communications with said external host computer at one or more predetermined times of a day on as-needed basis.

10. An image forming apparatus as defined in claim 7, wherein said communication mechanism performs said communications via a telephone network.

11. An image forming apparatus as defined in claim 7, wherein said communication mechanism performs said communications via an Internet using Internet functions of E-mail or a file transfer protocol.

12. An information control system, comprising:
    an image forming apparatus comprising:
        a control unit comprising an integrated circuit chip dedicated to an electronic money application;
        a data input and output port configured to exchange monetary information via said integrated circuit chip;
        a process cartridge comprising an electronic money application unit including another integrated circuit chip dedicated to said electronic money application;
        a memory; and
        a first communication mechanism configured to perform communications for said monetary information; and
    an external host computer located at a remote control center, said external host computer comprising:
        a data base for storing history information for a plurality of image recording apparatuses including said image forming apparatus; and
        a second communications mechanism configured to perform communications for said monetary information,
    wherein said image forming apparatus and said external host computer establish a communication connection with a specific address predetermined by said remote control center,
    said image forming apparatus generates configuration information of said image forming apparatus, stores i t in said memory, and sends it to said host computer through said communication connection,
    said host computer generates a certified configuration configuration information sent from said image forming apparatus, stores it in said data base at said specific address, and sends said certified configuration information back to said image forming apparatus,
    said image forming apparatus updates said configuration information with said certified configuration information received from said host computer after verification of it with said configuration information stored in said memory,
    said image forming apparatus sends a request for communications for said monetary information with said certified configuration information, said host computer approves said request for communications for said monetary information requested by said image forming apparatus by verifying said certified configuration information sent from said image forming apparatus with said certified configuration information stored in said data base.

13. An information control system as defined in claim 12, wherein said control unit generates said configuration information using said integrated circuit chips installed in said control unit and said process cartridge.

14. An information control system as defined in claim 12, wherein said host computer newly generates said certified configuration information each time it approves said request for communications requested by said image forming apparatus, said certified configuration information newly generated being different from the one previously generated, and said image forming apparatus updates said newly generated certified configuration information after said communications for said monetary information is completed.

15. An information control system as defined in claim 14, wherein said host computer controls said history information of said image forming apparatus in association with said newly generated certified configuration application and afterwards accepts said request for communications when receiving it with said newly generated certified configuration application from said image forming apparatus.

16. An information control system as defined in claim 12, wherein said history information includes apparatus history information including a cumulative number of prints performed, a cumulative amount of consumable items consumed, configuration of optional equipment, and errors that have occurred.

17. An information control system as defined in claim 12, wherein said history information includes customer history information including names of users and a cumulative number of prints performed per each user.

18. An information control method, comprising the steps of:
  providing an image forming apparatus comprising:
    a control unit comprising an integrated circuit chip dedicated to an electronic money application;
    a data input and output port configured to exchange monetary information via said integrated circuit chip;
    a process cartridge comprising an electronic money application unit including another integrated circuit chip dedicated to said electronic money application;
    a memory; and
    a first communication mechanism configured to perform communications for said monetary information; and
  placing an external host computer located at a remote control center, said external host computer comprising:
    a data base for storing history information for a plurality of image recording apparatuses including said image forming apparatus; and
    a second communications mechanism configured to perform communications for said monetary information,
  establishing a communication connection between said image forming apparatus and said external host computer establish with a specific address predetermined by said remote control center;
  generating configuration information of said image forming apparatus;
  storing said configuration information in said memory;
  sending said configuration information to said host computer through said communication connection;
  creating a certified configuration information by adding a certification code to said configuration information sent from said image forming apparatus;
  writing said certified configuration information in said data base at said specific address;
  transferring said certified configuration information back to said image forming apparatus;
  updating said configuration information stored in said memory with said certified configuration information received from said host computer after verification with said configuration information stored in said memory;
  transmitting a request for communications for said monetary information with said certified configuration information; and
  approving said request for communications for said monetary information transmitted from said image forming apparatus by verifying said certified configuration information transferred from said image forming apparatus with said certified configuration information written in said data base.

19. An information control method as defined in claim 18, wherein said generating step generates said configuration information using said integrated circuit chips mounted in said control unit and said process cartridge.

20. An information control method as defined in claim 18, further comprising steps of newly generating said certified configuration information each time said approving step approves said request for communications transmitted from said image forming apparatus, said certified configuration information newly generated being different from the one previously generated, and updating said newly generated certified configuration information after said communications for said monetary information is completed.

21. A method of operating an item of office equipment comprising:
  automatically generating and updating, at said item of office equipment, configuration and history information describing a configuration and a history thereof;
  automatically storing said configuration and history information, as updated, at the item of office equipment;
  removably connecting an electronic money card to said item of office equipment, and selectively charging the card in relation to at least one of said configuration and said history information stored at the item of office equipment;
  sending at least one of said configuration and said history information, as updated, to a remote host upon the occurrence of selected events; and
  receiving, at said item of office equipment, an authorization code updated to reflect selected changes in at least one of said configuration and said history information, and storing the authorization code as updated.

22. A method as in claim 21 in which the step of sending at least one of said configuration and said history information, as updated, to the host comprises sending the authorization code as updated.

23. A method as in claim 22 in which the step of receiving the authorization code, as updated, comprises verifying the received code at the item of office equipment and storing the verified code for future sending to said host.

24. A method as in claim 23 in which the selected events include powering up the item of office equipment.

25. A method as in claim 23 in which the selected events include selected changes in the configuration of the item of office equipment.

26. A method as in claim 21 in which the configuration information comprises information uniquely identifying selected components of the item of office equipment.

27. A method as in claim 21 in which the history information comprises information regarding usage of the item of office equipment.

28. A method as in claim 21 including the step of carrying out image forming operations at said item of office equipment and including information thereon in said history information.

29. A method as in claim 21 comprising the step of including in said configuration information a unique identification of a consumable product included in said item of office equipment, and including in said history information data regarding replacement of said consumable product.

30. A method as in claim 29 including sending to and receiving from a host, information regarding said consumable product.

31. A method as in claim 30 including the step of charging a money card connected to the item of office equipment based at least in part on said information regarding the consumable product sent to and received from the host.

32. A method of maintaining an item of office equipment communicating with a remote host comprising:

generating and updating, at said item of office equipment, at least one of configuration information describing a configuration thereof and history information describing a history thereof;

storing said configuration and history information, as updated, at the item of office equipment;

sending at least one of said configuration and said history information, as updated, to the remote host upon the occurrence of selected events, and storing at the host the information sent by the item of office equipment;

generating an authorization code at the host in response to information received from the item of office equipment, said host updating said code into an updated code in response to new information sent to the host from the item of office equipment;

wherein said storing at and sending from the item of office equipment comprises including said updated code, and wherein each of the item of office equipment and the host carries out a verification procedure to verify the updated code;

wherein matching sets of at least one of said configuration and said history information are maintained at the host and at the item of office equipment, and security is provided by the use of the updated authorization code.

33. A method as in claim 32 in which said host communicates with additional items of office equipment and maintains and updates a unique set of at least one of said configuration and said history information for each of said items of office equipment.

34. A method as in claim 33 in which at least some of said items of office equipment carry out image forming operations and include information thereof in said history information.

35. An item of office equipment comprising:

means for automatically generating and updating configuration and history information describing a configuration and a history of said item of office equipment;

means for storing said configuration and history information, as updated, at the item of office equipment;

an electronic money card removably connected to said item of office equipment;

means for selectively charging the card in relation to at least one of said configuration and said history information stored at the item of office equipment;

means for sending at least one of said configuration and said history information, as updated, to a remote host upon the occurrence of selected events; and means for receiving an authorization code updated to reflect selected changes in at least one of said configuration and said history information, and storing in authorization code as updated.

36. A method as in claim 35 in which the configuration information comprises information uniquely identifying selected components of the item of office equipment.

37. A system for maintaining an item of office equipment communicating with a remote host comprising:

an item of office equipment, a remote host, and a communication link therebetween;

means for generating and updating, at said item of office equipment, at least one of configuration information describing a configuration thereof and history information describing a history thereof;

means for storing said configuration and history information, as updated, at the item of office equipment;

means for sending at least one of said configuration and said history information, as updated, to the remote host via said communication link upon the occurrence of selected events, and for storing at the host the information sent by the item of office equipment;

means for generating an authorization code at the host in response to information received from the item of office equipment, said host updating said code into an updated code in response to new information sent to the host from the item of office equipment;

wherein said storing at and sending from the item of office equipment comprises including said updated code, and wherein each of the item of office equipment and the host carries out a verification procedure to verify the updated code;

whereby matching sets of at least one of said configuration an said history information are maintained at the host and at the item of office equipment, and security is provided by the use of the updated authorization code.

38. A system as in claim 37 including additional items communicating with said host via said communication link, wherein said host maintains and updates a unique set of at least one of said configuration and said history information for each of said items of office equipment.

39. A system as in claim 38 in which at least some of said items of office equipment comprise means for carrying out image forming operations.

* * * * *